United States Patent Office 3,227,763
Patented Jan. 4, 1966

3,227,763
PROCESS FOR PREPARING CRYSTALLIZABLE COMPLEXES OF RETINENE AND CERTAIN PHENOLIC MATERIALS
George L. Fletcher, Jr., Rochester, N.Y., assignor to Eastman Kodak Company, Rochester, N.Y., a corporation of New Jersey
Rochester, N.Y.
No Drawing. Filed Apr. 21, 1961, Ser. No. 104,538
6 Claims. (Cl. 260—598)

This invention relates to chemistry. More particularly, it relates to vitamins.

Vitamin A aldehyde is a useful, highly active vitamin A compound. It can be reduced to vitamin A alcohol which in turn can be converted to vitamin A esters, such as the acetate and palmitate esters of commerce. Vitamin A aldehyde is a pentaene aldehyde or pentaenal represented by the following structural formula:

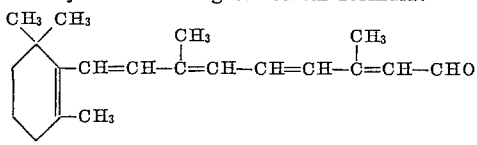

Because of the presence of olefinic bonds in the molecule, vitamin A aldehyde displays geometric isomerism with differences in biological activity existing between the geometric isomers. The highest biological activity or vitamin potency is exhibited by the compound previously referred to in the art as 2,6-trans, trans vitamin A aldehyde, all trans vitamin A aldehyde or simply retinene. Now, and hereinafter, under the recently published "Definitive Rules for the Nomenclature of the Vitamins" by the International Union of Pure and Applied Chemistry, J. Am. Chem. Soc. 82, 5575–84 (1960), vitamin A aldehyde generically is referred to as retinal. Therefore, hereinafter, the all trans compound is referred to as all trans retinal.

In the synthesis of retinal the product often obtained is a mixture of geometric isomers. Because of the differences in biological activity between all trans retinal and its geometric isomers it is frequently desirable to separate all trans retinal from the isomer mixture. At one time such a separation was not feasible because of the closely related properties of the various isomers. However, within recent years Benton and Robeson found and disclosed in their U.S. Patents Nos. 2,683,746, 2,683,747, 2,765,343, 2,765,344 and 2,835,679, that certain phenolic materials, herein referred to as complexing agents, form crystallizable complexes with all trans retinal and not with the geometric isomers of all trans retinal, and that under aqueous alkaline conditions these complexes readily decompose to release all trans retinal which can be feasibly separated in high purity from the complexing agents. Hence, a practical process for separating all trans retinal from its geometric isomers has been developed.

This separation process involves admixing a complexing agent with the isomeric mixture whereby the crystallizable complex is formed, cooling the mixture to cause crystallization of the complex, separating the complex crystals from the mixture, regenerating all trans retinal and separating all trans retinal from the complexing agent. In general the separation process is carried out at atmospheric pressure preferably under a nitrogen blanket.

While this process has been of great advantage and is highly efficient, nevertheless, there is a need for its improvement. An object of this invention is to improve this process.

More particularly, an object of this invention is to so improve this separation process as to substantially increase the yield of all trans retinal.

These and other objects which may appear as this specification proceeds are achieved by this invention.

In summary, this invention is based on the discovery that establishing and maintaining in this process during the formation of the crystallizable complex the total ambient pressure below atmospheric pressure but higher than the sublimation pressures of the complexing agent, retinal and complex results in an increased yield of crystallizable complex and thus an increased yield of all trans retinal. Yields of all trans retinal as high as 88% have been obtained under the conditions of this invention compared to yields as high as 82% under the ambient pressure conditions heretofore employed. In this regard, within the ambient pressure range of this invention, yield of the crystallizable complex appears to be directly related to the ambient pressure during formation of the complex. As ambient pressure is decreased, the yield of crystallizable complex is increased until such a low ambient pressure is reached that sublimation of complexing agent, retinal or complex, as the case may be, occurs. At this point yield of crystallizable complex is reduced.

The improved process of this invention, therefore, broadly comprises forming a crystallizable complex of all trans retinal and a complexing agent by contacting all trans retinal with said complexing agent at an ambient pressure less than atmospheric pressure, preferably less than 20 millimeters of mercury, but greater than the sublimation pressures of said complexing agent, all trans retinal and complex.

In its more specific and practical aspects the improved process of this invention relates to the separation of all trans retinal from a mixture of all trans retinal and isomers thereof. In these aspects the process comprises (1) admixing said mixture and a complexing agent at an ambient pressure less than atmospheric pressure but greater than the sublimation pressures of said complexing agent all trans retinal and retinal complex, whereby a crystallizable complex is formed, (2) cooling the admixture to a temperature preferably in a range from about 0° C. to about 10° C., whereby complex is crystallized, (3) separating crystals of complex from the admixture and (4) releasing all trans retinal from the complex.

The complexing agent as aforementioned is a phenolic material that forms crystallizable complexes with all trans retinal in preference to the geometric isomers of retinal. Typical of the many phenolic materials that form crystallizable complexes with all trans retinal are hydroquinone, monoalkyl hydroquinones (for example: 2-methyl hydroquinone, 2-ethyl hydroquinone, 2-tertiary-amyl hydroquinone and similar monoalkyl hydroquinones), monohalohydroquinones (for example: 2-chlorohydroquinone, 2-bromo-hydroquinone and the like), 2,5-dialkyl hydroquinone (for example: 2,5-dimethyl hydroquinone, 2,5-diethyl hydroquinone, 2,5-ditertiary amyl hydroquinones and the like), 2,5-dihalohydroquinones (for example: 2,5-dichlorohydroquinone), 4-alkoxy phenols (for example: 4-methoxy phenol, 2-methyl-4-methoxy phenol and the like), 4-dialkylamino phenols (for example: 4-dimethylamino phenol, 4-diethylamino phenol, 2-methyl-4-dimethylamino phenol and the like), phenol, 3-alkyl, 3-halogen and 3-hydroxy substituted phenols (for example: 3-methyl phenol, 3-ethyl phenol, 3-octyl phenol, 3-chlorophenol, resorcinol and similar meta substituted phenols), 4-halogen and 4-alkyl substituted phenols (for example: 4-methyl phenol, 4-butyl phenol, 4-bromophenol and similar para-substituted phenols), 2,4,5-trihydroxy-n-butyrophenone, alpha-naphthol, beta-napthol, phenyl hydroquinone, 3,4-dialkylphenols (for example: 3,4-dimethylphenol, 3,4-dibutylphenol and related 3,4-dialkylphenols), 3-alkyl-4-halogen substituted phenols (for example: 3-methyl-4-bromophenol, 3-amyl-4-chlorophenol and similar 3-alkyl-4-halogen substituted phenols), sesamol, 2,2'-alkyl-bis-(4-alkoxy phenols) such as, for example, 2,2'-isobutylidene-bis-(4-methoxy phenol), 2,2'-methylene-bis-(4-butoxy phenol), 2,2'-octylidene-bis-(4-ethoxy phenol), and the like, 2,2'-alkyl-bis-(hydroquinone) such as, for example, 2,2'-isobutylidene-bis-(hydroquinone), 2,2'-octylidene-bis-(hydroquinone) and related compounds, and 3-hydroxy-4-halogen substituted phenols (for example: 3-hydroxy-4-chlorophenol, 3-hydroxy-4-bromophenol, and related phenolic compounds). Complexes of all trans retinal and any of the above phenolic materials, or complexes of all trans retinal and any other phenolic material, are within the present process. The term "phenolic material" as used herein refers broadly to that group of organic compounds which contain one or more hydroxyl groups attached to an aromatic ring.

Some phenolic materials form complexes with equimolar proportions of all trans retinal, while other phenolic materials form complexes involving one molar proportion of phenolic material and two molar proportions of all trans retinal. The present process applies to complexes containing one all trans retinal moiety and to complexes containing more than one all trans retinal moiety.

In addition to control of the ambient pressure at which contacting of the complexing agent and all trans retinal occurs, temperature and time should also be correlated in order to obtain maximum yields of crystallizable complex. Thus, the temperature at which contacting occurs preferably should be in a range from about 50° C. to about 120° C. and usually in a range from about 50° C. to about 90° C. with the optimum temperature being about 72° C. Generally the lower the temperature at which contacting occurs the longer the contact time needed to obtain a desired yield. However, the contact time should be in a preferred range from about two hours to about seventy hours. Noteworthy is the fact that under the influence of gentle heat conversion of isomers of retinal to all trans retinal occurs to a significant extent in the process of this invention as evidenced by the yield of complex. These preferred ranges of contact temperature and time enable maximum conversion to be obtained.

This invention is further illustrated by the following examples which are presented for purposes of illustration and not of restriction.

*Examples 1–11*

These examples illustrate the influence of ambient pressure on the production of the complex of all trans retinal and a complexing agent such as hydroquinone.

In each one of these examples there was employed 1.0 kilogram of a U.V. analysed blend comprising 51.2 percent by weight of a distilled mixture of all trans retinal and geometric isomers thereof and 33.3 percent by weight of a mixture of an inert, non-volatile, hydrocarbon solvent for the retinal and a neutral triglyceride oil. There was also used 0.228 kilogram (based on a mole plus 15 weight percent per estimated mole of all trans retinal) of hydroquinone (pulverized to an average particle size of 100 mesh, U.S. screen size).

The retinal blend and hydroquinone were mixed together in an enclosed reactor. During the mixing the ambient pressure was reduced from atmospheric pressure to about 20 millimeters of mercury. The mixture usually boiled and foamed from the air being disengaged from the mixture. When the boiling had subsided, nitrogen gas was introduced into the reactor until the ambient pressure was at about atmospheric pressure. The ambient pressure was then reduced again to about 20 millimeters of mercury and the procedure repeated five times. This degassing treatment substitutes nitrogen for the air trapped around the hydroquinone particles and appears to be necessary in order to obtain good product color.

After the degassing step, nitrogen was pumped from the reactor until the selected ambient pressure was reached. The reactor contents were held at the selected ambient pressure for 72 hours at a temperature of 70° C. without stirring.

The ambient pressure was then adjusted with air to atmospheric pressure. The complexing mixture was chilled to —20° C. and held at this temperature for about 15–20 hours while stirring. Crystals of complex of all trans retinal and hydroquinone formed. A liter of commercial hexane at —20° C. was added to the slurry and the slurry filtered. The reactor was rinsed with two one liter portions of hexane, which subsequently were poured over the filter cake on the filter as washes.

The washed filter cake or complex was dried under vacuum, ground, weighed and then assayed by U.V. analysis. Yield of crystalline complex was calculated by means of the following equation:

$$\text{Yield in percent} = \frac{A \times B \times 100}{C \times D}$$

wherein A represents $$\frac{E(1\%, 1 \text{ cm.}, 381 \text{ m}\mu, \text{ethanol}) \text{ of complex}}{1295}$$

B represents the weight of the complex, C represents $$\frac{E(1\%, 1 \text{ cm.}, 370 \text{ m}\mu, \text{ethanol}) \text{ of retinal}}{1400}$$

and D represents $$\frac{678 \times \text{weight of retinal}}{568}$$

The retinal blends employed in Examples 1–4 had a retinal concentration of 74.5 percent by weight. Yields of complex of all trans retinal and hydroquinone at various selected ambient pressures were found to be:

| Example | Ambient Pressure (millimeters of mercury) | Yield (percent) |
|---|---|---|
| 1 | 40 | 74.0 |
| 2 | 25 | 75.3 |
| 3 | 11 | 81.0 |
| 4 | 3–5 | 85.7 |

The retinal blend employed in Examples 5–7 had a retinal concentration of 75.0 percent by weight. Yields of complex of retinal and hydroquinone at selected ambient pressures were found to be:

| Example | Ambient Pressure (millimeters of mercury) | Yield (percent) |
|---|---|---|
| 5 | 30 | 47.4 |
| 6 | 20 | 65.3 |
| 7 | 3–5 | 85.8 |

The retinal blend employed in Examples 8–11 had a retinal concentration of 51.2 percent by weight. Yield of all trans retinal hydroquinone complex at various selected ambient pressures were found to be as follows:

| Example | Ambient Pressure (millimeters of mercury) | Yield (percent) |
|---|---|---|
| 8 | 50 | 77.1 |
| 9 | 30 | 79.3 |
| 10 | 10 | 85.0 |
| 11 | 1 | 84.2 |

Thus, in the formation of a crystallizable complex of all trans retinal and hydroquinone by contacting of the retinal and hydroquinone reduction of ambient pressure results in a substantial increase in the yield of the complex.

Moreover, maximum yields were obtained at ambient pressures less than about 20 millimeters of mercury.

On the other hand each of these ambient pressures is greater than the sublimation pressures at the prevailing temperature of hydroquinone, retinal and complex of all trans retinal and hydroquinone. At 70° C. the sublimation pressure of hydroquinone is about $6 \times 10^{-3}$ millimeter of mercury. While the sublimation pressures at 70° C. of retinal and complex have not been measured, there are data which indicates they are less than $6 \times 10^{-3}$ millimeter of mercury. Thus, at about $6 \times 10^{-3}$ millimeter of mercury the sublimation temperature of retinal is about 90° C. and the sublimation temperature of the complex is about 185° C. Hence, to achieve sublimation at 70° C. of these compounds the ambient pressures would have to be reduced to substantially less than about $6 \times 10^{-3}$ millimeter of mercury.

Examples 12–13

These examples illustrate the influence of ambient pressure on the production of the complex of all trans retinal and a complexing agent such as isobutylidene-bis-hydroquinone. In each of these examples the following procedure was employed.

10 grams of mixed isomer retinal (analyzing by U.V. analysis about 51.2 weight percent retinal) were mixed with 5.50 grams of isobutylidene bis hydroquinone and heated at 70° C. for 72 hours at the selected ambient pressure. The reaction mixture was suspended in cold hexane and the resulting crystalline complex removed by filtration. The filter cake or complex was then dried under vacuum, ground, weighed, and then assayed by U.V. analysis. The filtrate was evaporated, degassed and assayed by U.V. analysis. The following tabulated data resulted.

| Ex. | Ambient Pressure (millimeters of mercury) | Dry Filter Cake Weight (grams) | Concentration of Retinal in Dry Filter Cake, Percent | Yield of Complex in Filter Cake, Percent | Recovery of Retinal in Filtrate, Percent |
|---|---|---|---|---|---|
| 12 | 30.0 | 9.20 | 33 | 50.0 | 23.6 |
| 13 | 0.6 | 9.45 | 37 | 58.0 | 24.6 |

Thus, regardless of the complexing agent, higher yields of complex are obtained by reduction of ambient pressure provided the ambient pressure is greater than the sublimation pressures of retinal, complexing agent and complex. In this regard, while the sublimation pressures at 70° C. of isobutylidene-bis-hydroquinone and all trans retinal complex thereof have not been measured, they are less than about $6 \times 10^{-3}$ millimeters of mercury. At about $6 \times 10^{-3}$ millimeters of mercury the sublimation temperature of isobutylidene-bis-hydroquinone is about 150° C. At about $6 \times 10^{-3}$ millimeters of mercury the sublimation temperature of the all trans retinal complex of isobutylidene-bis-hydroquinone would be even greater. Hence, the sublimation pressures at 70° C. of these two materials is substantially less than the reduced ambient pressures of Examples 12 and 13.

Thus, the process of forming crystallizable complexes from all trans retinal and complexing agent, which is particularly useful in separating all trans retinal from its isomers, has been improved. The improvement does not require additional reactants nor does it result in additional material to be reprocessed. Moreover, very little extra expense is necessary to practice the concepts of this invention.

Other features, advantages and embodiments of this invention will be apparent to those in the exercise of ordinary skill in the art upon reading the foregoing specification.

I claim:
1. In a process for preparing a crystallizable complex of all trans retinal and a phenolic complexing agent by admixing retinal and said complexing agent, the improvement of performing said admixing at an ambient pressure less than about 20 millimeters of mercury but greater than the sublimation pressures of said complexing agent, retinal and said complex.

2. In a process for preparing a crystallizable complex of all trans retinal and a phenolic complexing agent by admixing retinal and said complexing agent, the improvement of performing said admixing at a temperature in a range from about 50° C. to about 120° C. for a period of time in a range from about two hours to about 70 hours and at an ambient pressure less than about 20 millimeters of mercury but greater than the sublimation pressures of said complexing agent, retinal and said complex.

3. In a process for preparing a crystallizable complex of all trans retinal and hydroquinone by admixing retinal and said hydroquinone, the improvement of performing said admixing at a temperature in a range from about 50° C. to about 90° C. for a period of time in a range from about two hours to about 70 hours and at an ambient pressure less than about 20 millimeters of mercury but greater than the sublimation pressures of said hydroquinone, retinal and said complex.

4. In a process for preparing a crystallizable complex of all trans retinal and isobutylidene bis hydroquinone by admixing retinal and said isobutylidene bis hydroquinone, the improvement of performing said admixing at a temperature in a range from about 50° C. to about 90° C. for a period of time in a range from about two hours to about 70 hours and at an ambient pressure less than about 20 millimeters of mercury but greater than the sublimation pressures of said isobutylidene bis hydroquinone, retinal and said complex.

5. In a process for separating all trans retinal from a geometric isomer thereof by admixing therewith an all trans retinal, phenolic complexing agent whereby a crystallizable complex of all trans retinal and said complexing agent is formed, crsytallizing said complex, isolating said crystals and then releasing said all trans retinal by contacting said crystals with an aqueous alkaline solution, the improvement of performing said admixing at an ambient pressure less than about 20 millimeters of mercury but greater than the sublimation pressures of said complexing agent, retinal and said complex.

6. In a process for separating all trans retinal from a geometric isomer thereof by admixing therewith an all trans retinal, phenolic complexing agent whereby a crystallizable complex of all trans retinal and said complexing agent is formed, crystallizing said complex, isolating said crystals and then releasing said all trans retinal by contacting said crystals with an aqueous alkaline solution, the improvement of performing said admixing at a temperature in a range from about 50° C. to about 120° C. for a period of time in a range from about two hours to about 70 hours and at an ambient pressure less than about 20 millimeters of mercury but greater than the sublimation pressures of said complexing agent, retinal and said complex.

References Cited by the Examiner

UNITED STATES PATENTS

| 2,683,746 | 7/1954 | Benton et al. | 260—598 |
| 2,683,747 | 7/1954 | Benton et al. | 260—598 |
| 2,765,343 | 10/1956 | Benton et al. | 260—598 |
| 2,765,344 | 10/1956 | Benton et al. | 260—598 |
| 2,835,679 | 5/1958 | Benton et al. | 260—598 |

LEON ZITVER, *Primary Examiner.*

CHARLES B. PARKER, *Examiner.*